(12) United States Patent
Robinson

(10) Patent No.: US 7,783,706 B1
(45) Date of Patent: Aug. 24, 2010

(54) FILTERING AND MANAGING ELECTRONIC MAIL

(75) Inventor: John D. Robinson, Little Rock, AR (US)

(73) Assignee: Aristotle.Net, Inc., Little Rock, AR (US)

( * ) Notice: Subject to any disclaimer, the term of this patent is extended or adjusted under 35 U.S.C. 154(b) by 1651 days.

(21) Appl. No.: 10/828,500

(22) Filed: Apr. 21, 2004

(51) Int. Cl.
  *G06F 15/16* (2006.01)
(52) U.S. Cl. ...................................... 709/206
(58) Field of Classification Search ................ 709/203, 709/207, 217, 223, 225, 206
  See application file for complete search history.

(56) References Cited

U.S. PATENT DOCUMENTS

| | | | | |
|---|---|---|---|---|
| 5,958,005 | A * | 9/1999 | Thorne et al. | 709/202 |
| 6,275,850 | B1 * | 8/2001 | Beyda et al. | 709/206 |
| 6,282,565 | B1 * | 8/2001 | Shaw et al. | 709/206 |
| 6,430,598 | B1 * | 8/2002 | Dorrance et al. | 709/203 |
| 6,694,335 | B1 * | 2/2004 | Hopmann et al. | 707/201 |
| 6,721,784 | B1 * | 4/2004 | Leonard et al. | 709/206 |
| 6,757,713 | B1 * | 6/2004 | Ogilvie et al. | 709/206 |
| 6,779,021 | B1 * | 8/2004 | Bates et al. | 709/206 |
| 6,938,065 | B2 * | 8/2005 | Jain | 709/201 |
| 6,983,308 | B1 * | 1/2006 | Oberhaus et al. | 709/206 |
| 7,107,298 | B2 * | 9/2006 | Prahlad et al. | 707/204 |
| 2002/0120748 | A1 | 8/2002 | Schiavone et al. | |
| 2003/0046353 | A1 | 3/2003 | Chung et al. | |
| 2003/0158905 | A1 | 8/2003 | Petry et al. | |

OTHER PUBLICATIONS

"Reading Your E-Mail When You Are Away From Bilkent", printed from http://lists.bilkent.edu.tr/mail/popmail.html, on Mar. 5, 2004.
Harris, D., "Drowning in Sewage", 2003.
Osterman, M., "Content Filtering Without Hardware or Software", *Network World Messaging Newsletter*, May 6, 2002.
"How to Postini", printed from http://www.rraz.net/postini/howto.htm.
"How Does the Spam Blocker Work", printed from http://thespameater.com/details.php, 2004.

* cited by examiner

*Primary Examiner*—Hussein A. Elchanti
(74) *Attorney, Agent, or Firm*—Rader, Fishman & Grauer PLLC

(57) ABSTRACT

Filtering and managing electronic mail is accommodated by allowing a user to designate an approved subject line phrase whose presence allows an incoming message to bypass certain message filtering operations. E-mail messages sent to the user are examined to determine whether their subject line includes the approved phrase. When the phrase is present in the message subject line, delivery of the message to the user is accommodated according to the settings prescribed by the user. E-mail management is also accommodated by allowing a user to download a message from a mail server to an e-mail client and subsequently restore the message onto the mail server as though it had not yet been downloaded.

6 Claims, 8 Drawing Sheets

FILTERING AND MANAGING ELECTRONIC MAIL

BACKGROUND OF THE INVENTION

1. Field of the Invention

This invention relates generally to processing e-mail, and more particularly to filtering and providing flexible access to e-mail.

2. Description of the Related Art

Electronic mail (e-mail) is now widely used for sending and receiving messages, for both personal and business uses. As the usage of e-mail has increased, so has the use of the medium to distribute unsolicited marketing messages. These messages are typically sent to numerous users, sometimes millions of users, in the hope that even a small percentage of the recipients will respond. The messages are often referred to as spam.

The proliferation of spam has various drawbacks. It is often annoying to receive even a limited number of unsolicited offers, as it is time consuming to review e-mail messages to determine that they are such, and then delete them. An e-mail account can be so afflicted with a spam problem that it can be rendered useless—an account left idle for a seemingly brief period may accumulate so many unwanted messages that it becomes too burdensome to review and remove them.

The unsolicited messages also consume processing and storage resources. Individuals and businesses have finite computing resources, and spam has increasingly strained them. For individual accounts, this may lead to situations where an e-mail account with a limited amount of capacity quickly reaches that capacity and becomes useless. For businesses, the problem multiplies based upon the number of employees on the e-mail system. Businesses are forced to purchase and manage more computer resources than are necessary for legitimate business purposes.

One solution to the growing spam problem has been the introduction of filtering systems that seek to automatically screen incoming mail. These filtering systems can be integrated into a mail server that is accessed by e-mail client devices. Filtering may also be provided by proxy servers or the like that handle incoming mail and engage in the filtering process prior to passing along e-mails to the mail server. With many of these systems, a recipient will receive approved e-mail in the usual fashion, and will navigate to interfaces managed by the filtering server to approve or dispose of questionable messages. The user will often be invited to engage in this review by a reminder e-mail sent through the original system, indicating that withheld messages are available for review.

While such filtering has been moderately effective at screening spam, the filtering process can be over and under-inclusive at times. Additionally, configuring filter settings can be time consuming for the user. Numerous categories of filtering have been developed. One such category is referred to as "black listing." According to this technique, messages from senders known to be distributors of unsolicited e-mails are automatically designated as undesirable, and are not passed along to the recipient as legitimate e-mail. Black list services automatically update the black list, and in some systems a user may also add names to the black list. While these techniques work well, they are often circumvented by repeated changes in originating addresses.

Heuristic techniques apply rules to characteristics found in analyzed messages to determine whether they are spam. Instances or combinations of particular terms in an e-mail and other criteria often result in a positive indication that the message is spam. These techniques are also helpful but can result in "false positives"—instances where e-mails are wrongly determined to be spam.

To help alleviate the false positive problem, "white list" techniques have been developed. These schemes maintain a list of senders that are known to be approved by the sender. This helps minimize the false positives problem somewhat, but also burdens the user with having to maintain the white list. Users quickly tire to the addition of senders to the white list. To help automate the maintenance of the white list, a confirmation technique has been used. There, a sender is sent a return e-mail requesting a second confirmation message from the sender before allowing message delivery. The rationale behind this scheme is that many automated spamming processes will not respond with a confirmation message. However, many legitimate senders also do not respond to the request for confirmation. Thus, with various conventional white list techniques, there are often messages that are erroneously determined to be unsolicited spam.

Another problem with e-mail management, particularly with system that implement an Internet based mail server that is variously accessible by the user, is accommodating access to e-mails that have already been downloaded and deleted from a mail server pursuant to access by the user. This may arise in various circumstances, such as where the user accesses the message from the office, then realizes that they may want to access the email from another location at a later time. While the message could simply be manually forwarded by the user to their own e-mail address, this can be cumbersome, can be hampered by errors in entering the e-mail address, and does not provide an e-mail that appears to be from the original sender. This is also an issue where the user is managing e-mail in conjunction with an e-mail filtering system, where the user may be unsure which e-mails are being retained and which are to be deleted.

Thus, while conventional e-mail filtering options have helped alleviate some problems related to unsolicited e-mail management, there remains a need for a system that allows the user to easily designate e-mails as desirable and simultaneously avoids false determinations that e-mails are not desirable. Additionally, there remains a need for an e-mail access system that allows e-mails to be downloaded to a client machine and subsequently returned to a mail server as though they had not been downloaded, and a need for a system that accommodates coherent management of e-mail.

SUMMARY OF THE INVENTION

In one aspect, the present invention enhances the management and filtering of electronic mail by accommodating various filtering operations but allowing the user a convenient mechanism for allowing select senders to bypass the filtering operation. This is accommodated by allowing the user to designate an approved subject line phrase. E-mail messages sent to the user are examined to determine whether their subject line includes the approved phrase. When the phrase is present in the message subject line, delivery of the message to the user is accommodated according to the setting prescribed by the user.

In some embodiments, when the approved subject line phrase is present in the subject line of an examined message, the sender of the examined message is added to an approved sender list. This allows the sender to merely include the approved phrase in the subject line of an initial message directed to the user. Subsequent messages from the sender are automatically excluded from filtering even if they are devoid of the approved phrase.

In some embodiments, when the approved subject line phrase is absent from the subject line, additional filtering options may be applied to the message to determine its disposition. This may entail designating the electronic mail message to a delete category where the approved subject line phrase is absent from the electronic mail message and the additional e-mail filtering criteria indicate the electronic mail message to be clearly identified as undesired. It may also entail designating the electronic mail message to a spam holding category where the approved subject line phrase is absent from the electronic mail message and the additional e-mail filtering criteria do not indicate the electronic mail message to be clearly identified as undesired and do not indicate the electronic mail message to be clearly identified as desired.

According to another aspect of the present invention, a user may download messages from a mail server to a mail client, and later restore the messages to the mail server as though they had never been downloaded.

In some embodiments, this aspect entails determining that an electronic mail message addressed to a particular user is resident at a mail server, receiving the electronic mail message at a mail client from the mail server pursuant to an electronic mail downloading procedure that entails deleting the electronic mail message from the mail server, receiving a request to restore the electronic mail message on the mail server following a completion of the electronic mail downloading procedure, and restoring the electronic mail message as though it had not been downloaded from the mail server in response to receiving the request.

In some embodiments, this aspect further entails creating a temporary message file that includes a re-written header and an original message body corresponding to the electronic mail message, wherein the re-written header indicates that the message is being sent from the original sender of the electronic mail message and to the particular user, and transmitting the temporary message file to the mail server.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1A:
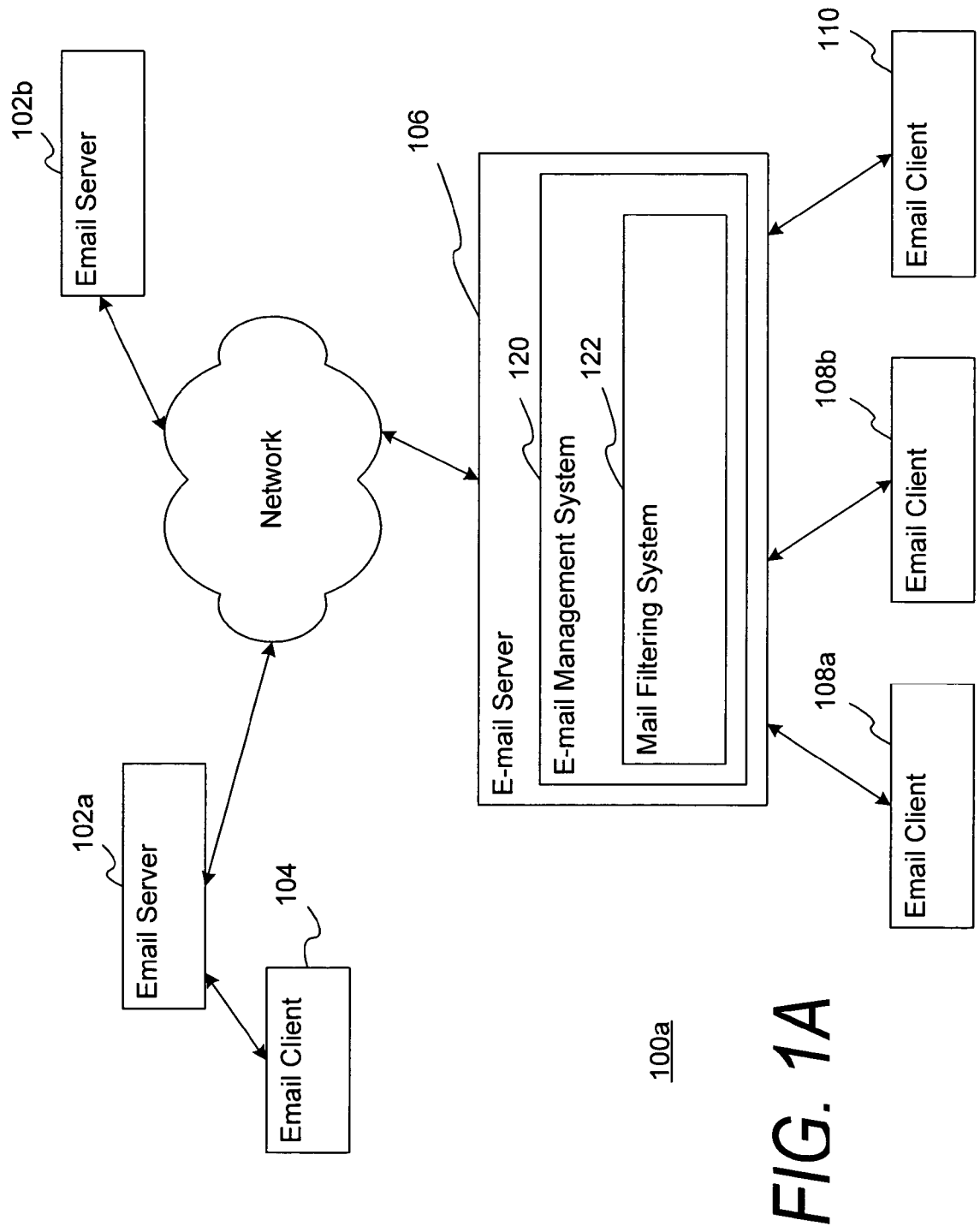
FIG. 1A is a block diagram illustrating a system for providing electronic mail including an embodiment of electronic mail filtering in accordance with the present invention.

FIG. 1A is a block diagram illustrating a system 100a for providing electronic mail including an embodiment of an electronic mail filtering system 122 in accordance with the present invention. In the system, an e-mail server 106 handles inbound and outbound messages for a variety of e-mail clients 108a-b, 110 to which it is associated. In addition to typically handling e-mail for multiple clients, the mail server 106 may do so for a single user that variously accesses email through multiple separate e-mail clients 108a-b. The messages processed by the e-mail server 106 may originate from or be addressed to other e-mail clients 104 that correspond to other e-mail servers 102a, 102b. Generally, the client and server elements provided in the electronic mail system 100a comprise conventional computer hardware and software for carrying out basic computing and network functionalities.

The e-mail server 106 implements conventional techniques to perform the basic functions of receiving e-mails for various users, determining which user the e-mail corresponds to and delivering the e-mail. Generally, an incoming mail message directed to a mail server is received and placed in an incoming message queue. Header information is examined to determine the recipient user and then the mail is designated to the recipient user's mailbox. In actuality, this operation entails storage of the message in a file corresponding to the recipient user. The recipient user retrieves her mail messages through an e-mail client that includes software for retrieving, parsing and viewing of the mail messages. Preferably, the e-mail client is WebSage as provided by Aristotle.net Inc., of Little Rock, Ark. Alternatively, any e-mail client such as Outlook Express as provided by Microsoft, Inc., of Redmond, Wash., Eudora as provided by Qualcomm Corporation of San Diego, Calif., or others may be provided.

In one embodiment, the network through which communications are made to accommodate sending and receiving e-mails by e-mail servers 102a-b, 106 on behalf of e-mail clients 104, 108a-b, 110 is the Internet, using conventional network protocols including TCP/IP. Sending and receiving e-mails is typically accommodated through inbound and outbound mail servers that cooperate to send and receive mail using standard protocols. Each e-mail server includes an outbound mail server using a protocol such as the Simple Mail Transfer Protocol (SMTP), and an inbound mail server that uses a protocol such as Post Office Protocol 3 (POP3) or Internet Message Access (IMAP). Although protocols such as SMTP and POP3 are referenced in the following description, such is for simplicity of description. The invention is not limited to embodiments implementing those protocols.

In a conventional e-mail system, a user invokes the e-mail client (e.g., 104) to send an e-mail using conventional syntax (username@domainname.domaintype). In doing so, the e-mail client 104 connects to the SMTP server component of the e-mail server 102a, providing the address of the sender and the recipient, along with the body of the message. If the recipient is in the same domain, then the SMTP server simply passes the message to the POP3 server in the same domain. If the recipient is not in the same domain, the SMTP server implements a Domain Name Server to obtain the IP address for the recipient's mail server, and sends the e-mail to that server, where it is then passed to the POP3 server. In either case, the POP3 server for the recipient places the message in the recipient's mail box (subject to the filtering processes to be described below).

The e-mail server maintains an e-mail file corresponding to each user whose account is managed by the e-mail server, and adds the new message to the e-mail file for a recipient user when an incoming message is so designated. Again, the e-mail client 108a-b, 110 communicates with the e-mail server 106 to retrieve messages. The inbound mail server (e.g., POP3) accommodates verification of the particular user such as through an account name and a password, and access to the e-mail file. In a conventional system, the email file for a particular user may be a single file that contains each message for the particular user sequentially appended to the file, with each message containing information such as the sender, recipient, subject, and a message. Attachments may also be included with the message in standard fashion.

In addition to the conventional e-mail processing functions, the e-mail server 106 is equipped with an e-mail management system 120 which further includes a mail filtering system 122. As described above, the usage of e-mail has been strained by the numerous unsolicited messages that are sent to recipients, typically in the form of commercial offers. The mail filtering system 122 includes routines for examining the various components of inbound messages and determining whether the e-mail should be designated for the recipient user (e.g., included in the e-mail file as being ready for receipt by the recipient the next time they invoke their e-mail client to retrieve the e-mail), or subject to some filtering operation such as holding the e-mail for review by the user or automatically discarding the message.

The mail filtering system 122 includes numerous filtering options that allow the user to configure the filtering of their e-mail. These options include provision of a list of e-mail addresses that the user wants to block, a list of e-mail addresses that the user definitely wants to receive messages from, and a list of keywords that the user can designate as custom indicia that an e-mail is not desired (e.g., the list of keywords can include common obscenities, words typically used in commercial offers that the user does not want to receive, etc.).

Additionally, to obviate problems related to incorrect determinations that an e-mail is undesirable (i.e., false positives), the mail filtering system 122 includes an approved subject line phrase functionality. This allows the user to designate a special phrase. When the special phrase is present in the subject line of an e-mail, that e-mail is immediately determined to be desired by the user.

In a configuration mode, the user indicates a desire to use the approved subject line functionality and inputs one or more special phrases. This is done through conventional input screens that allow the user to enter the information. The information is then maintained in association with the user's account. Inbound messages directed to the particular user that are not pre-approved (e.g., known white list senders) are checked to see whether the subject line includes the user's special phrase. If it is present, then the e-mail is effectively delivered to the user. Absence of the special phrase subjects the e-mail to other filtering operations, which may result in the e-mail being withheld from delivery, deleting, or the like.

The special phrase may be one or more alphabetic, numeric, or alphanumeric strings. It may simply be a unique word that the user designates. In one embodiment, the user is invited to designate a "secret phrase" by the filtering system, which would provide a category clearly different from other filtering options. This helps the user to remember the function of the line filtering process and to remember the secret phrase for distribution to approved senders. The senders who have been given the phrase later include it in the subject line of e-mails that they send to the user, and those e-mails are automatically passed through the mail filtering system as desirable.

In one alternative, once a sender includes the secret phrase in the subject line of a message, that sender is automatically added to the sender white list. This allows the sender to simply use the secret phrase in the first e-mail that they send to the user/recipient, with future e-mails being automatically passed through the filter even without the secret phrase. These aspects are described further with reference to the block diagram of FIG. 2 and the flow diagram of FIG. 4 below.

The e-mail management system 120 and mail filtering system 122 are preferably provided as software. This may be variously embodied including but not limited to a computer process that carries out the described functionality, a system such as a processor that executes instructions held in memory to carry out the described functionality, or a computer readable storage medium that stores instructions that when executed carry out the described functionality.

Figure 1B:
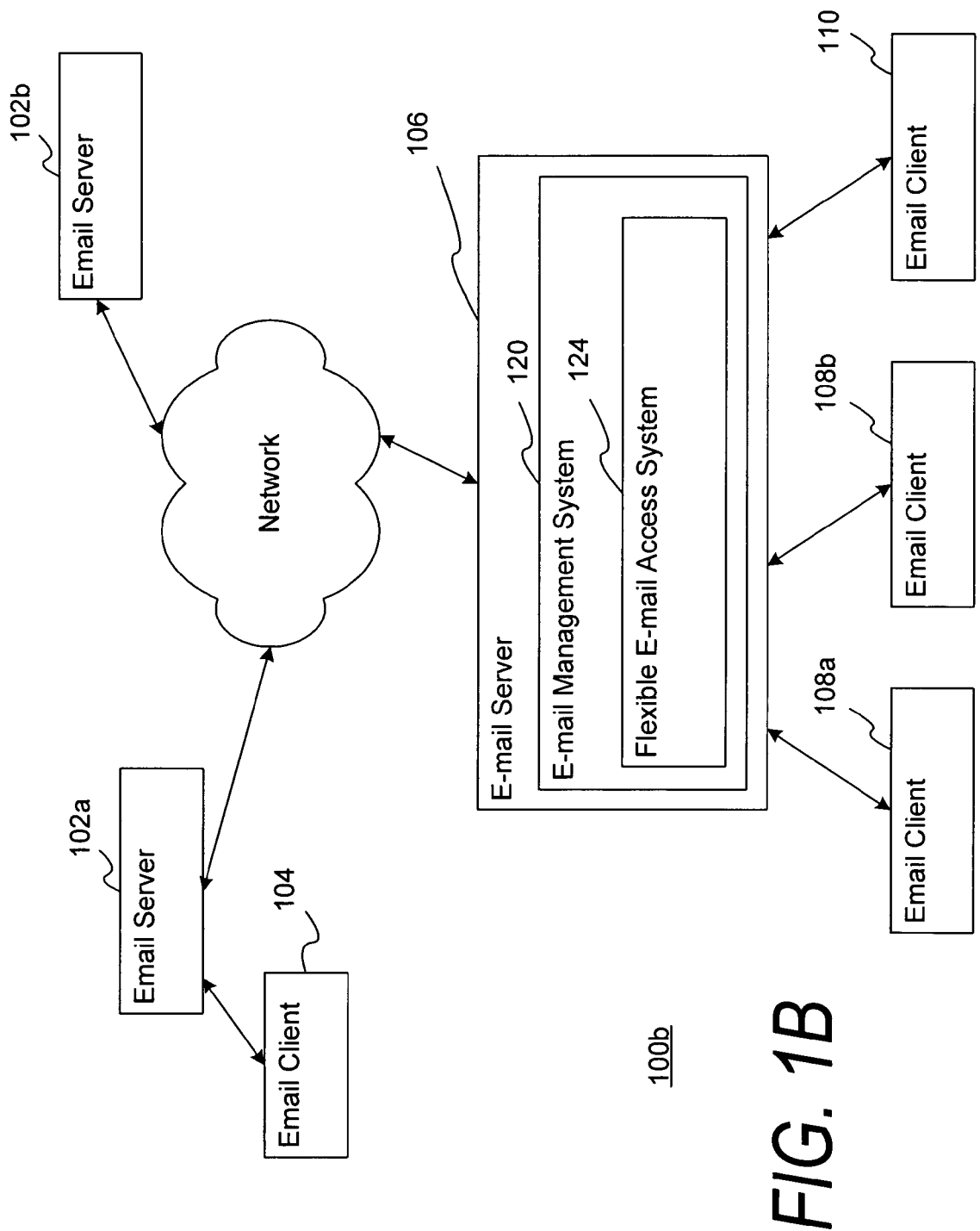
FIG. 1B is a block diagram illustrating a system for providing electronic mail including an embodiment of a flexible e-mail access system in accordance with the present invention.

The block diagram of FIG. 1B illustrates a system for providing electronic mail 100b including an embodiment of a flexible e-mail access system 124 in accordance with the present invention. The flexible e-mail access system 124 is provided as part of the previously described e-mail management system 120, and operates in any conventional system for providing electronic mail such as that previously described with regard to FIG. 1A. The flexible e-mail access system 124 may be provided separately or along with an e-mail management system that implements the above described mail filtering system.

When a user accesses e-mail it may be downloaded to the client device using the above described conventional processes. Although the user may print the e-mail or forward the e-mail to their own e-mail address for later use, these actions are often undesirable for the user for a number of reasons. The flexible e-mail access system 124 allows the user to download and review a received e-mail on an e-mail client (e.g., 108(a)), but then restore the e-mail on the e-mail server 106 so that the e-mail can be subsequently accessed as though it had never been downloaded. This is accommodated through a conventional check off box or similar input that allows the user to easily designate the e-mail for restoration. Upon concluding the session, the flexible e-mail access system 124 operates in conjunction with the e-mail management system 120 to update the e-mail file corresponding to the user to include the restored e-mail. When the user subsequently accesses his or her e-mail such as through another e-mail client 108b, the e-mail will simply appear among those e-mails ready for download and review. The return to server function can be applied to multiple e-mails simultaneously through easy to navigate interfaces. After being returned to the server, e-mail messages appear as new messages, as if they had never been retrieved. The flexible e-mail access aspects of the invention are described further with reference to the block diagram of FIG. 3 and the flow diagram of FIG. 5 below.

The flexible e-mail access system 124 is also preferably software and can be variously embodied as described with regard to the mail filtering system.

Figure 2:
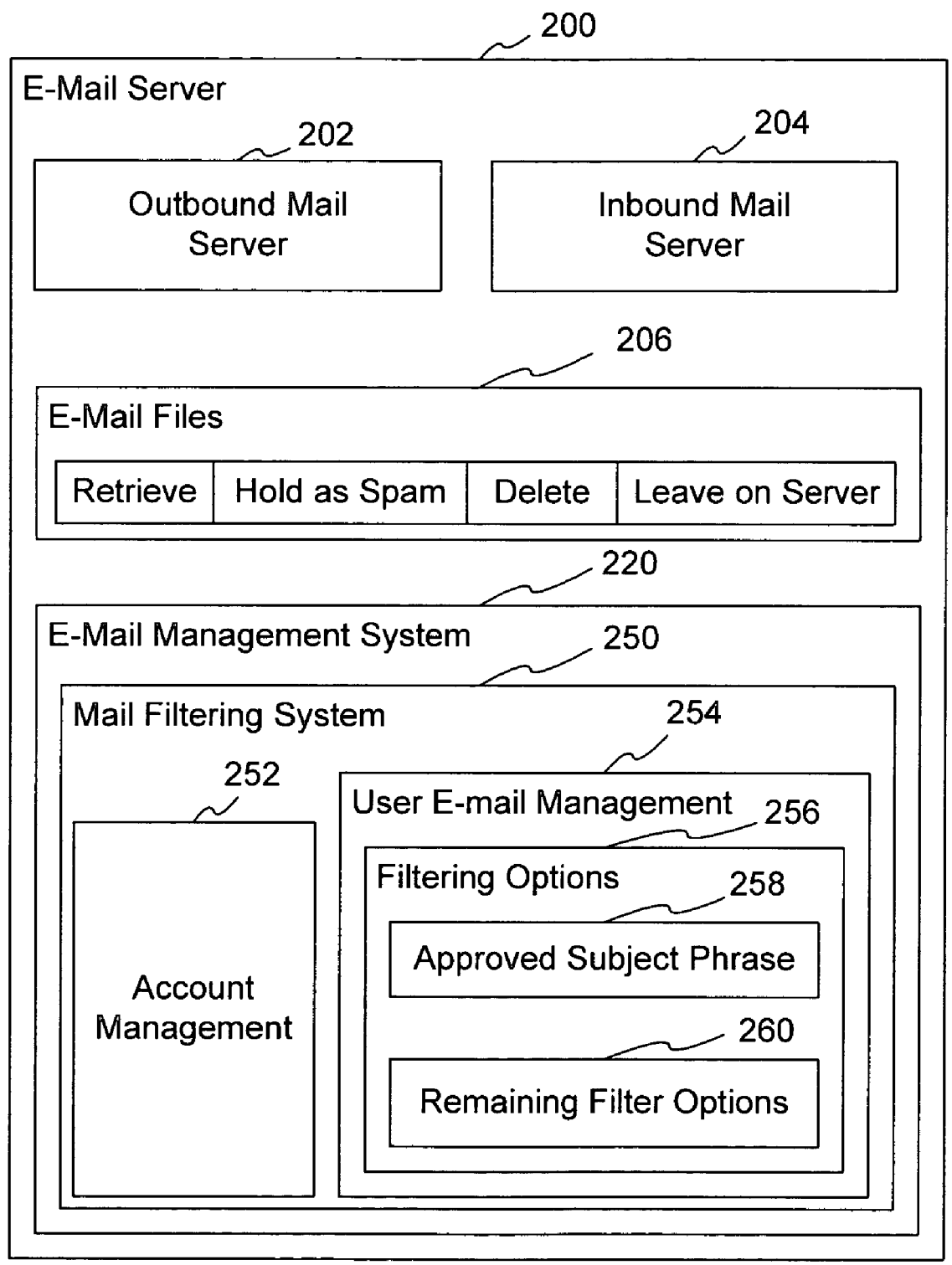
FIG. 2 is a block diagram illustrating an embodiment of a mail server including an electronic mail filtering system in accordance with the present invention.

FIG. 2 is a block diagram illustrating an embodiment of an e-mail server 200 including an e-mail management system 220 with a mail filtering system 250 in accordance with the present invention. The e-mail management system 220 operates in the context of an e-mail delivery system as previously described. The system implements an e-mail server 200 having an outbound mail server 202, inbound mail server 204 and managed e-mail files 206. The outbound mail server 202 handles outbound messages and communicates with e-mail clients in that regard. The inbound mail server 204 handles inbound messages and also communicates with e-mail clients in that regard. The messages for users are stored and managed in e-mail files 206, with segregation of such files by users. Account information such as usernames and passwords is also retained and managed to organize access to the e-mail messages. The e-mail files 206 are shown to be divided into retrieve, hold as spam, delete, and leave on server categories. Mail in the retrieve or hold category is stored on the user's computer once they have retrieved their e-mail. Messages marked as delete are deleted before they are downloaded, which saves the user time. Messages marked "leave on server" are left untouched. In addition to being downloaded to the user's computer upon retrieval, messages marked for retrieve and delete are removed from the server when the user retrieves e-mail. Retrieved messages appear in the user's inbox, while held messages go into a special folder called "spam holding." The artisan will recognize the various alternatives for organizing and determining whether, when and how to make e-mail accessible at one or more of any user's computers.

The mail filtering system 250 includes an account management module 252 and a user e-mail management module 254 that further includes a filtering options module 256 with an approved subject phrase module 258 and a remaining filter options module 260. Although one modular breakdown is disclosed, embodiments of the present invention are not limited to this particular breakdown as the functionality may be provided through more or fewer modules. Additionally, although shown at a mail server, the mail filtering functionality may also be provided a single location corresponding to a user or at the mail client.

The account management module 252 retains account information corresponding to each registered user of the e-mail server. For the basic account information (username, password), this may parallel or merely invoke the functionality previously described for the e-mail server 200. The user e-mail management module 254 communicates with the account management module 252 and accommodates customized configuration of e-mail settings by the user. These settings include e-mail filtering settings, which are described further below. The settings may also include e-mail viewing options and other features which need not be described for an understanding of this aspect of the present invention. The user-email management module 254 also retains the settings input by the user using such interfaces, and provides the information to allow the e-mail management system to carry out appropriate processing (e.g., filtering decisions) of inbound e-mails.

The filtering options module 256 communicates with the user e-mail management module 254 and accommodates entry of customized filtering options by the user. It provides user interfaces that allow the user to input various filtering settings. In addition to the approved subject phrase filtering 258, a variety of remaining filtering options 260 such as address black and white listing and keyword based blocking may be provided.

Figure 4:
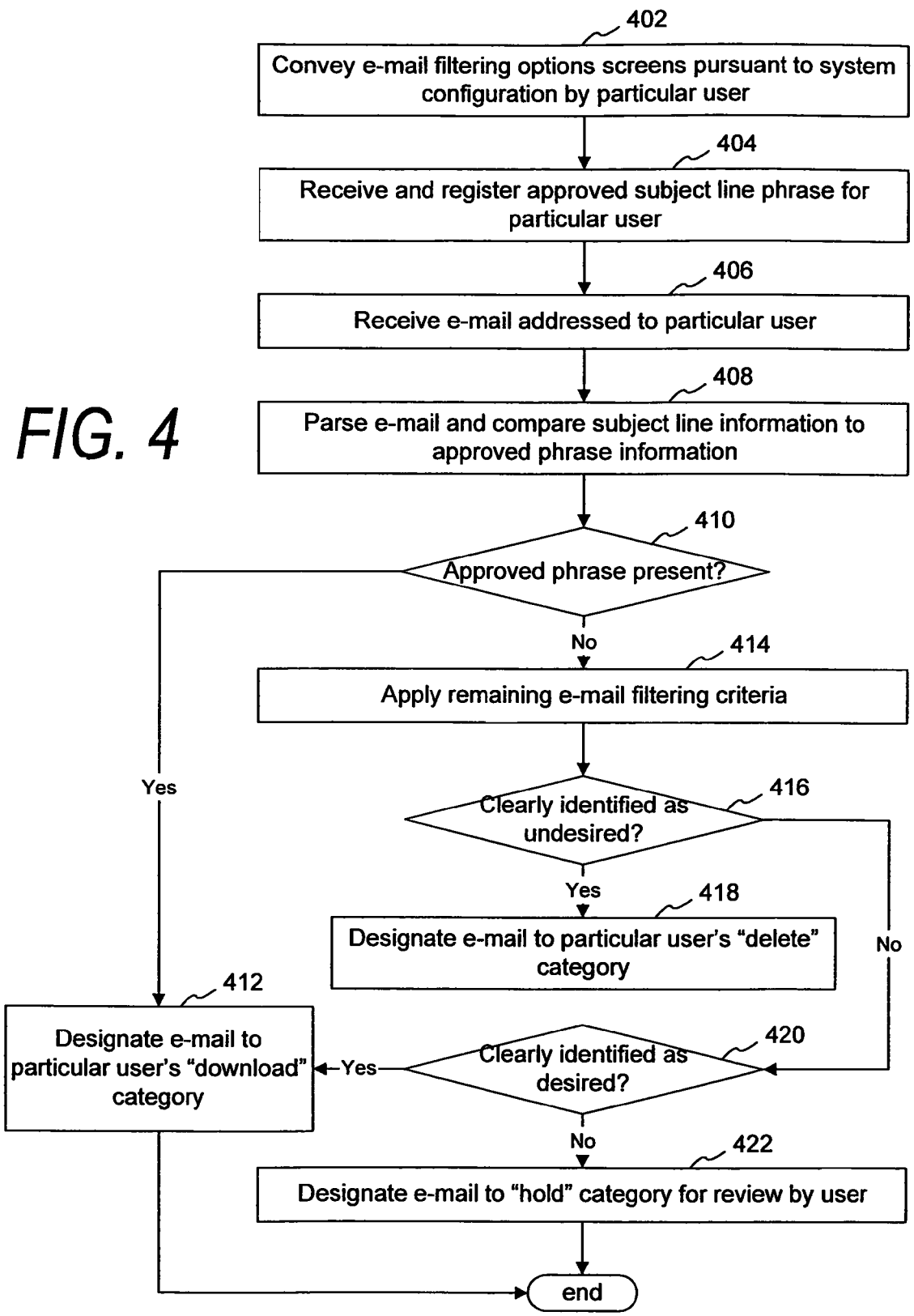
FIG. 4 is a flow diagram illustrating an embodiment of electronic mail filtering in accordance with the present invention.

The functionality provided by the approved subject phrase filtering module 258 is now further described in connection with FIG. 4. During a set up phase, e-mail filtering options are conveyed 402 to a particular user pursuant to system configuration. Such a user would be a registered user of the e-mail management system, and would have already provided relevant account information. Alternatively, an administrator may have provided the relevant account information, with the particular user being given rights to alter filtering options, or an administrator could carry out both tasks. The term user interchangeably refers to the end user and/or the administrator.

Preferably, the e-mail filtering options are conveyed 402 using conventional graphical displays (e.g., HTML based) that include buttons for navigating to screens that allow entry of filtering information and fields for inputting. Pursuant to providing such screens, an approved subject phrase is received 404 and registered in connection with a particular user. The various filtering lists (e.g., allowed addresses, allowed phrases, blocked addresses, blocked phrases) are stored as memory lists that are serialized to disk on a per-user basis. The serialized files are stored in the user's e-mail directory.

During a normal e-mail processing operation, the e-mail server receives 406 an e-mail addressed to the particular user. This is accommodated through conventional mail processing protocols including but not limited to SMTP. Preferably, e-mail for each user is also designated into "download", "delete" and "hold" categories as previously described. Alternatively, the e-mail may be categorized according to any number of options, including but not limited to placement in the user's inbox for approved e-mail and a quarantined area for suspect email.

The received e-mail is then parsed 408 so that its subject line information can be retrieved and compared to approved subject line information corresponding to the particular user. This step is undertaken with the presumption that approved subject line phrase filtering will be applied. If the user has previously elected not to invoke this feature, then the approved subject line filtering steps may of course be bypassed. The determination whether such filtering is present can be accommodated by a flag that indicates the user's selection. The e-mail parsing component of this process is accommodated through conventional e-mail processing techniques for identifying the components of the e-mail. The comparison is undertaken by identifying the user to whom the e-mail was addressed, retrieving any and all approved subject line phrases against which a comparison will be made for the identified user, and then comparing the information in the e-mail subject line to the approved subject line phrase(s) to see whether any are present in the subject line.

In one embodiment, the determination 410 whether the subject line contains an approved subject line phrase is accommodated along with the determination of approved or blocked subject and sender line phrases through a case-insensitive search in the subject and sender lines, respectively. Partial matches may be variously accepted where the settings dictate such a scenario, such as any inclusion of a phrase in any portion of the subject line. The matching may be accomplished using a state machine and corresponding analysis of the lexical stream in the subject (or sender) line.

If it is determined 410 that an approved phrase is present, then the e-mail is designated 412 to the recipient user's download category and it will be listed as such ready for the user to download the next time they appropriately access the e-mail server. As stated previously, various alternatives may apply, including those where approved (i.e., not filtered out for review) e-mail is automatically forwarded to the inbox for the recipient, such that it is present in their inbox the next time they access their e-mail from a workstation or the like.

In one alternative, the sender is automatically added to a sender white list once they are identified as having used the approved subject line phrase. This entails identifying the match, sending the message to the appropriate approved e-mail box (e.g., download, inbox, etc.), and updating the filter settings for the recipient user to include the sender among the white listed senders. This may also be confirmed by an e-mail to the sender indicating that they are on the white list, and that they no longer need to include the special phrase with their future e-mails to the recipient.

If the subject line of the analyzed message is not determined 410 to include an approved subject line phrase, then the message is further analyzed to determine how it should be designated. In one embodiment, this operation is as follows. Remaining e-mail filtering criteria are applied 414, and then it is determined 416 whether the e-mail is clearly identified as undesired. An example of an e-mail that would be determined as clearly undesired is an e-mail received from a sender found on the black list (e.g., the user's custom black list or a company black list that applies to employees including the user). Clearly undesired e-mails may also be determined through automatic filtering, analysis of the entire e-mail for forbidden phrases, and other criteria. A clearly undesired e-mail is designated 418 to the "delete" category, an action that may automatically occur, may occur upon expiration of a given period of time, may occur at user prompting, or the like.

Where a subject message is not determined 416 as clearly undesirable, it is then determined 420 whether the message is clearly desired. This may be the result of simultaneous filtering functions, or provided as separate steps. Where separate steps are provided, the initial determination 416 may implement filters with discrete results (e.g., sender black list), and the second determination 420 may implement filtering that has more "grey" results such as rules based filtering.

If this determination 420 is that the e-mail is clearly desired, then it would be designated to the approved or download category 412 as described above. If it is not determined 420 that the e-mail is clearly desirable, then it may be placed in a hold category. Messages in this category are separately designated from download (or direct inbox) e-mails and those designated for deleting.

Accordingly, e-mails are appropriately filtered and designated to categories for the recipient, thus providing effective filtering of e-mails but also allowing a convenient mechanism for circumventing the filter, without requiring the recipient to actively manage filter settings.

Figure 3:
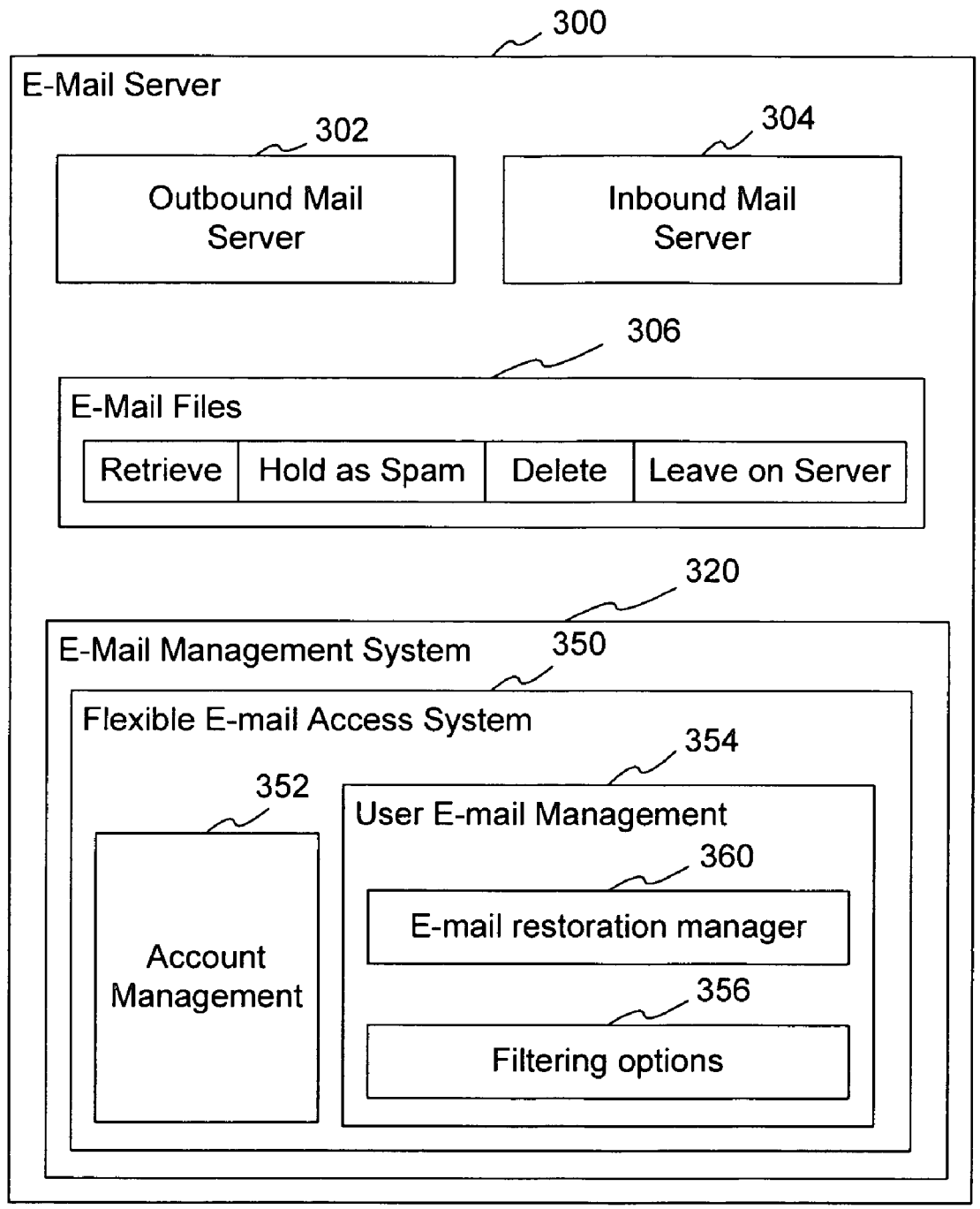
FIG. 3 is a block diagram illustrating an embodiment of a mail server including a flexible e-mail access system in accordance with the present invention.

FIG. 3 is a block diagram illustrating an embodiment of a mail server 300 including a flexible e-mail access system 350 in accordance with the present invention. The basic aspects of the e-mail server 300, including the outbound mail server 302, inbound mail server 304, e-mail files 306, as well as the e-mail management system 320 are analogous to the previously described components in FIG. 2, and the description of those elements need not be repeated for an understanding of this aspect of the present invention.

The mail server 300 of FIG. 3 differs in its inclusion of the flexible e-mail access system 350. Similar to the mail filtering system (250, FIG. 2), the flexible e-mail access system includes an account management module 352 that retains and manages basic account information corresponding to the various e-mail users handled by the e-mail server 300. Also similar is the inclusion of the user e-mail management module 354, as well as the filtering options 356, which are variously configurable as previously described.

In this instance, the user e-mail management module 354 further includes the e-mail restoration manager 360. The user e-mail management module 354 allows a particular user to manage the various designated e-mails in their account. Although shown included in the user e-mail management module 354 on an e-mail server 300, the functionality of the e-mail restoration manager 360 may also be provided on an e-mail client in whole or in part.

Figure 6A:
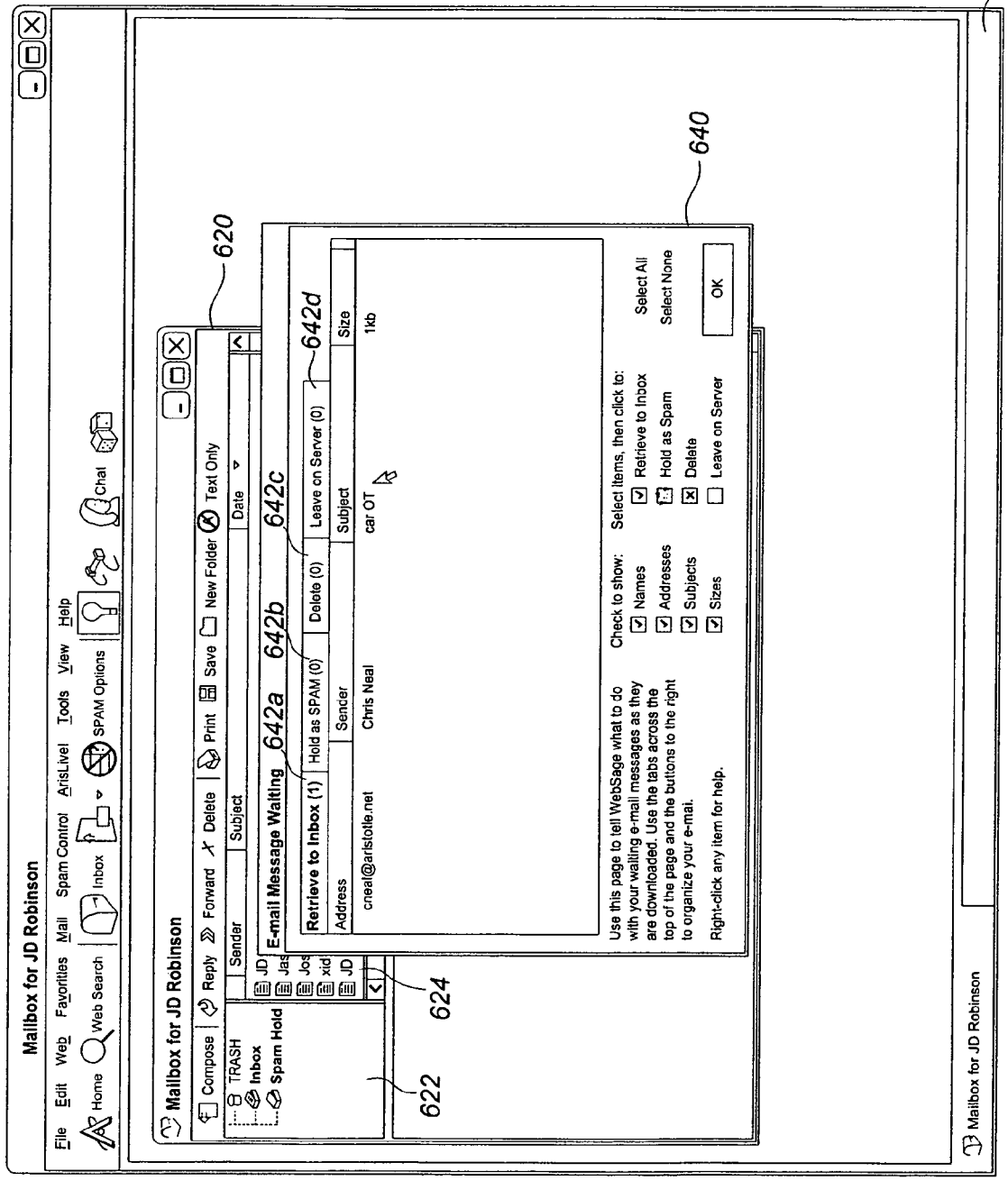
FIGS. 6A-B are display diagrams illustrating an embodiment of e-mail management screens in accordance with the present invention.

FIG. 6A is a display diagram 600*a* that illustrates an example of screens used to manage the designation and potential downloading of e-mails available for a user from the mail server. Particularly, three panels 610, 620, 640 are shown as cascaded windows that respectively provide a e-mail account management panel 610, a mailbox management panel 620 and a waiting messages panel 640.

The e-mail account management panel 610 includes conventional drop down selections for generally configuring the settings of the e-mail account and for making selections such as the settings and phrases used to filter spam as previously described.

The mailbox management panel 620 includes a navigational frame 622 and an adjacent contents frame 624. Selection of an folder such as "Inbox" or "Spam Holding" in the navigational frame 622 prompts an update of the contents frame 624 to display what is contained in that folder. Particularly, when the Inbox is selected identification information about the messages contained in the user's inbox is displayed. A preview functionality allows a portion of a message to also be shown in a preview frame, and selection of a message in the inbox allows review of the entire message, in conventional fashion. The Inbox contains messages that have already been downloaded from the mail server.

The user may also seek to retrieve messages that reside on the mail server but have not yet been downloaded to the e-mail client. Pursuant to this process, the waiting messages panel 640 is used to engage in various operations related to the management of messages that reside on the mail server. As previously described, the messages are organized into categories. Tabs may be used to organize and manipulate the messages residing in those categories. Particularly, tabs for "Retrieve to Inbox" 642*a*, "Hold as Spam" 642*b*, "Delete" 642*c* and "Leave on Server" 642*d* are shown, with "Retrieve to Inbox" having been selected. In this state, the messages that are ready for downloading are listed in a panel. The listing may be customized according to selections by the user (e.g., the user can elect to have the name, address, subject, and/or size information for each e-mail displayed in its listing). Actions may also be directed at any number of the items listed through a check box next to the listed item and various options that are associated with each checked item once an OK button is pressed. Specifically, the user may designate that an e-mail shall be retrieved to the Inbox, or to the Hold as Spam folder at their e-mail client. The user may also elect to delete the checked message(s) from the mail server, or to leave them on the mail server upon completion of the download.

Figure 6B:
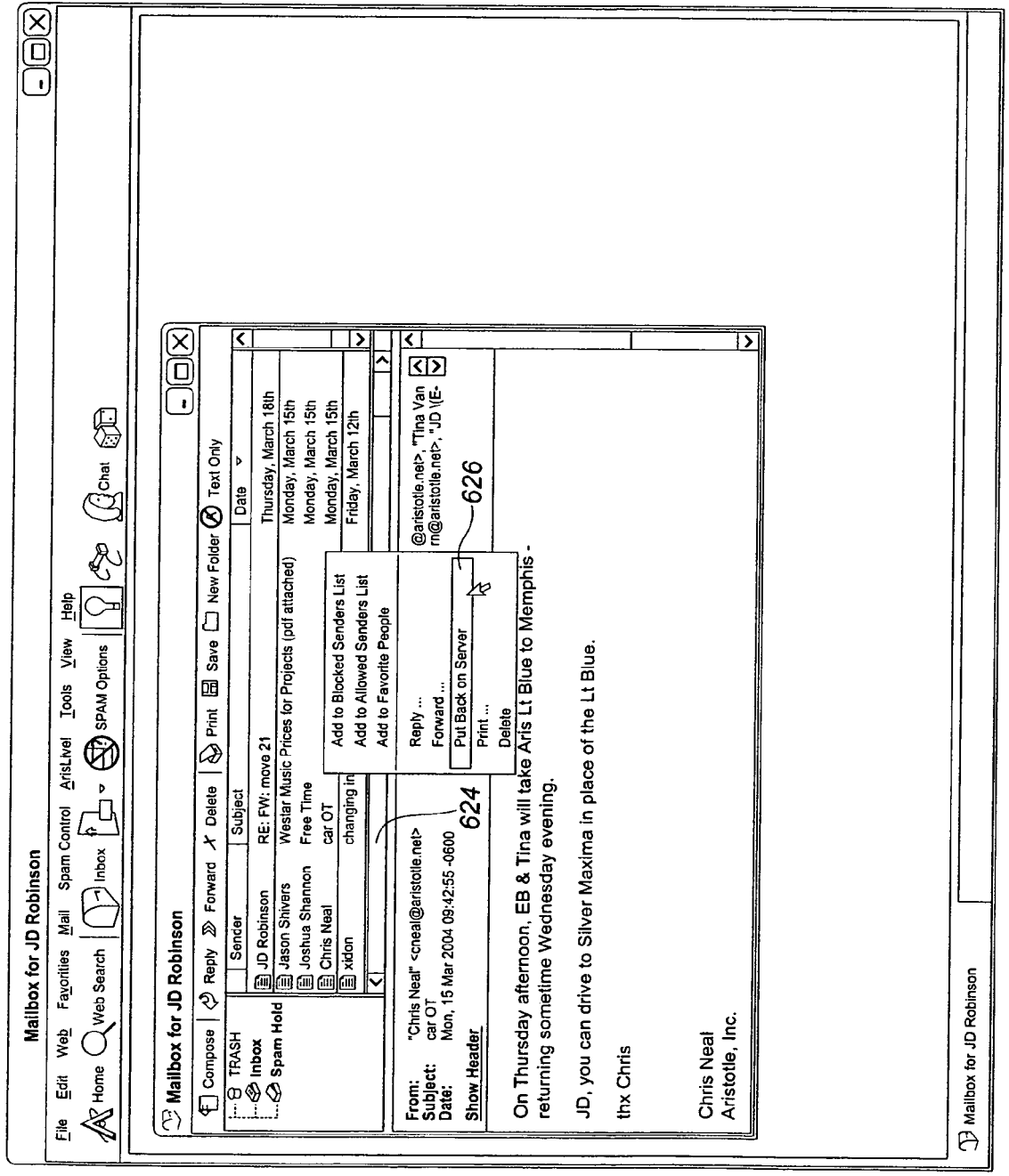

In addition to the basic functions of managing e-mails, the e-mail restoration manager allows a recipient to initially view a message that had been downloaded to an e-mail client inbox, and then restore the e-mail to the download category, for subsequent access as though the e-mail had not been downloaded. Using the described waiting messages panel 640, the user may have already downloaded messages to his Inbox folder, such as the illustrated message from "Chris Neal". FIG. 6B is a display diagram 600*b* showing screens that are updated accordingly, with that e-mail being listed in the contents panel 624 upon selection of the inbox folder. As indicated in the preview panel, or through selection of the message from the listing, the message may then be read by the user. The user may then realize that they would prefer to put the message back on the server, such as through a determination that they would like to subsequently download the e-mail from the mail server from a different machine. In one embodiment, this function is accommodated by initially selecting one or more messages, such as the three messages from "Jason Shivers", "Joshua Shannon", and "Chris Neal" that are shown in FIG. 6B. Then a conventional mouse operation such as a right click can prompt display of a menu of operations that may be applied to the highlighted messages. Among the listed options is "Put Mail Back on Server" 626. Left clicking on this item prompts a return of the message to the server as though it had never been downloaded to the e-mail client.

Figure 5:
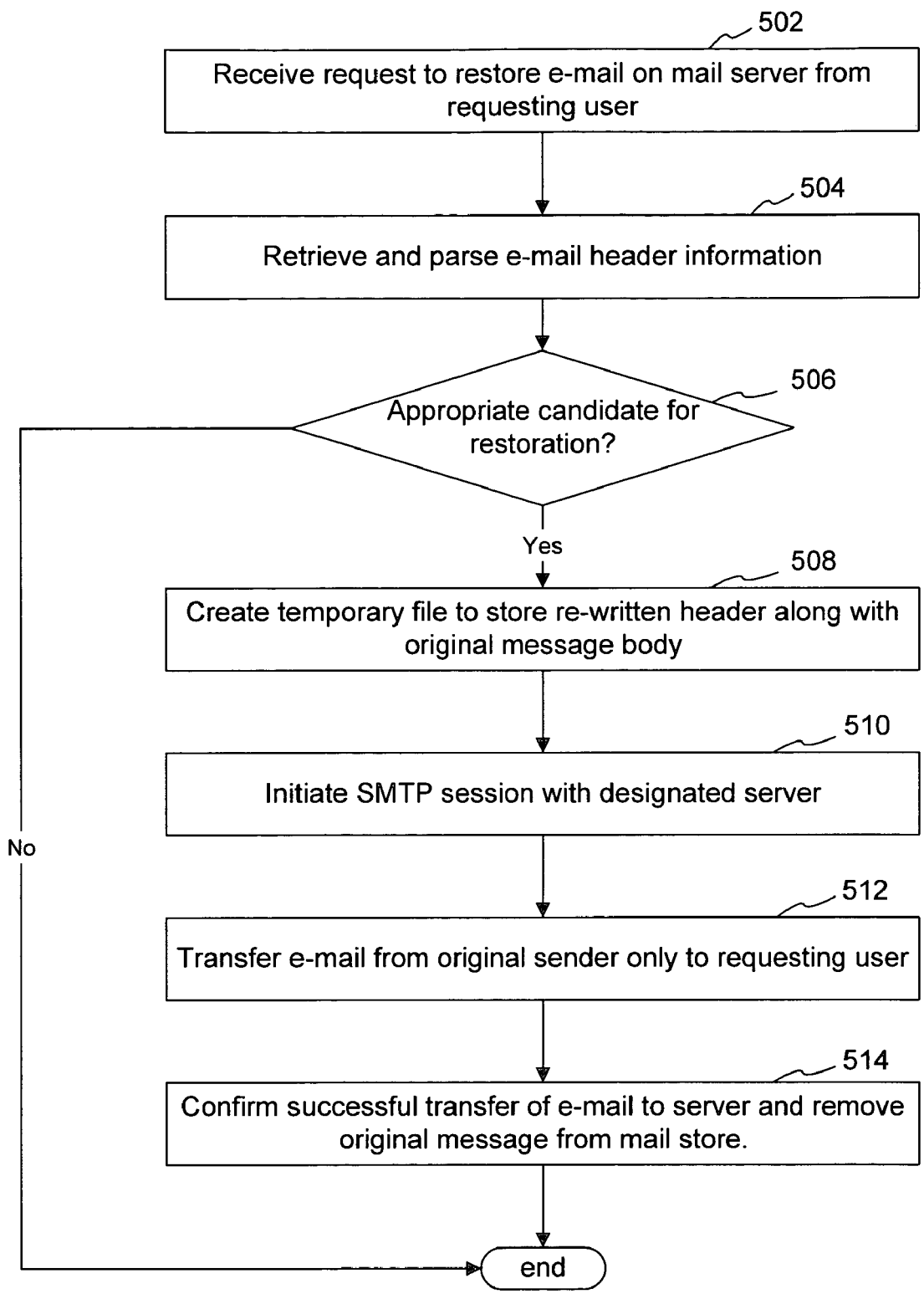
FIG. 5 is a flow diagram illustrating an embodiment of restoring e-mails to a mail server in accordance with the present invention.

The functionality of the e-mail restoration manager 360 in the management and restoration of e-mail is now further described with reference to the flow diagram of FIG. 5. Through interfaces such as those described, a request to restore e-mail on a mail server is received 502 from a requesting user. The e-mail header information is then retrieved and parsed 504. Particularly, the "date" and "sender" information, as well as the "to" and "cc:" recipients are identified using conventional techniques for obtaining such information. The information is then examined to determine 506 whether the e-mail is an appropriate candidate for restoration on the server.

To qualify as an appropriate candidate, it is determined whether the currently logged on user is among the original recipients of the e-mail. If it is determined 506 that the message is not appropriate, the process ends. If the message is appropriate, then a temporary file is created 508. This temporary file stores a rewritten header using the previously parsed header information along with the original message body. This temporary file is then used as the basis for "sending" the message to the requesting user so that it will appear at the mail server, ready for downloading or other appropriate e-mail management actions. This is accommodated by initiating 510 an SMTP session with the designated server, and then transferring 512 the message to the server, with the sender information indicating that the message was "sent" by the original sender. Where multiple recipients had originally been sent the message, the message need not be resent to other listed parties, as only the requesting user is seeking to restore the message on the server. Thus, the session accommodates transfer of the message only to the requesting user. Finally, a successful transfer of the e-mail message to the server is confirmed 514, and the copy of the message contained in the user's inbox is deleted from the mail storage as it will be ready for downloading from the server the next time the user accesses the mail server.

Accordingly, a facility that allows an e-mail recipient to review an e-mail on a client device and fully restore the e-mail to a mail server as though it head never been accessed is provided in accordance with this aspect of the present invention.

Thus embodiments of the present invention produce and provide for the effective filtering and management of e-mails. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for restoring electronic mail messages to a mail server, the method comprising:
   determining that an electronic mail message addressed to a particular user is resident at a mail server;
   receiving the electronic mail message at a mail client from the mail server pursuant to an electronic mail downloading procedure that entails deleting the electronic mail message from the mail server;
   receiving a request to restore the electronic mail message on the mail server following a completion of the electronic mail downloading procedure; and
   restoring the electronic mail message as though the electronic mail message had not been downloaded from the mail server in response to receiving the request, wherein restoring the electronic mail message comprises creating a temporary message file that includes a re-written header and an original message body corresponding to the electronic mail message, wherein the re-written header indicates that the message is being sent from the original sender of the electronic mail message and to the particular user, and transmitting the temporary message file to the mail server as the restored electronic mail message.

2. The method of claim 1, further comprising:
   determining whether the electronic mail message is an appropriate candidate for restoration prior to restoring the electronic mail message.

3. A computer program product for restoring electronic mail messages to a mail server, the computer program product stored on a computer readable medium and adapted to perform operations comprising:
   determining that an electronic mail message addressed to a particular user is resident at a mail server;
   receiving the electronic mail message at a mail client from the mail server pursuant to an electronic mail downloading procedure that entails deleting the electronic mail message from the mail server;
   receiving a request to restore the electronic mail message on the mail server following a completion of the electronic mail downloading procedure; and
   restoring the electronic mail message as though the electronic mail message had not been downloaded from the mail server in response to receiving the request, wherein restoring the electronic mail message comprises creating a temporary message file that includes a re-written header and an original message body corresponding to the electronic mail message, wherein the re-written header indicates that the message is being sent from the original sender of the electronic mail message and to the particular user, and transmitting the temporary message file to the mail server as the restored electronic mail message.

4. The computer program product of claim 3, wherein the operations further comprise:
   determining whether the electronic mail message is an appropriate candidate for restoration prior to restoring the electronic mail message.

5. A system for restoring electronic mail messages to a mail server, the system comprising:
   a e-mail management module, which determines that an electronic mail message addressed to a particular user is resident at a mail server, and receives the electronic mail message at a mail client from the mail server pursuant to an electronic mail downloading procedure that entails deleting the electronic mail message from the mail server; and an e-mail restoration module, in communication with the e-mail management module, which receives a request to restore the electronic mail message on the mail server following a completion of the electronic mail downloading procedure, and restores the electronic mail message as though the electronic mail message had not been downloaded from the mail server in response to receiving the request, wherein the e-mail restoration manager restores the electronic mail message by creating a temporary message file that includes a re-written header and an original message body corresponding to the electronic mail message, wherein the re-written header indicates that the message is being sent from the original sender of the electronic mail message and to the particular user, and transmitting the temporary message file to the mail server as the restored electronic mail message.

6. The system of claim 5, wherein the e-mail restoration manager determines whether the electronic mail message is an appropriate candidate for restoration prior to restoring the electronic mail message.

* * * * *